United States Patent [19]

Chang et al.

[11] 3,891,591

[45] June 24, 1975

[54] COATING COMPOSITIONS

[75] Inventors: David Chi-kung Chang, Springfield; Maurice James McDowell, Media, both of Pa.

[73] Assignee: E. I. du Pont de Nemours & Company, Wilmington, Del.

[22] Filed: Aug. 13, 1973

[21] Appl. No.: 388,061

[52] U.S. Cl. ......... 260/29.6 WB; 117/161 UZ; 117/161 UT; 117/161 UD; 117/161 UN; 117/161 UC; 260/29.6 RW; 260/29.7 NR; 260/29.7 W; 260/41 A; 260/41 B; 260/41 C; 260/41.5 A; 260/901
[51] Int. Cl. ....................... C08f 37/18; C08f 45/24
[58] Field of Search ... 260/29.6 WB, 29.6 RW, 901, 260/29.7 W, 29.7 NR; 117/161 UC, 161 UZ

[56] References Cited
UNITED STATES PATENTS

| | | | |
|---|---|---|---|
| 2,567,011 | 9/1951 | Diesslin et al. | 260/465.7 |
| 3,083,224 | 3/1963 | Brace et al. | 260/461 |
| 3,112,295 | 11/1963 | Marvel | 260/85.5 |
| 3,309,331 | 3/1967 | McDowell et al. | 260/29.67 A |
| 3,446,761 | 5/1969 | Antonelli et al. | 260/29.6 RW X |
| 3,492,374 | 1/1970 | Bleu et al. | 260/950 |
| 3,574,791 | 4/1971 | Sherman et al. | 260/901 X |
| 3,652,497 | 3/1972 | Junas et al. | 260/29.6 RW X |
| 3,687,885 | 8/1972 | Abriss et al. | 260/29.6 WB |
| 3,692,885 | 9/1972 | Anello et al. | 260/950 |
| 3,822,228 | 7/1974 | Petrella et al. | 260/29.6 F |

FOREIGN PATENTS OR APPLICATIONS 1,052,924 12/1966 United Kingdom

OTHER PUBLICATIONS

Industrial Chemicals, Information Bulletin, TLF-1800 Fluorochemical, E. I. du Pont de Nemours & Co., Inc., October 1968.

*Primary Examiner* — Melvin Goldstein
*Assistant Examiner* — W. C. Danison

[57] ABSTRACT

Aqueous coating compositions, such as paints, are provided which have improved stain resistance with resulting improved cleanability. The coating compositions comprise aqueous dispersions of water-insoluble polymeric binders having about 0.5 to 10% by weight of ethylenically unsaturated acid monomer units and about 0.2 to 10% by weight of solids of selected thickeners used with about 0.01 to 5% by weight of solids of a fluorocarbon compound containing one or more segments having at least one water-solvatable polar group of water solubility and one or more segments having fluorinated carbon atoms terminated by trifluoromethyl groups for aiding in stain resistance in combination with the selected thickeners.

20 Claims, No Drawings

COATING COMPOSITIONS

BACKGROUND OF THE INVENTION

1. Field of Invention:

This invention relates to aqueous coating compositions and more particularly to aqueous paints.

2. Prior Art:

In recent years, latex paints, i.e., paints based on aqueous dispersions of synthetic organic polymers, have come into widespread use because they can be easily applied, easily cleaned from brushes and rollers, and because they are generally free of objectionable odor.

It has always been a goal to continually improve latex paints. For example, in U.S. Pat. No. 3,309,331, issued Mar. 14, 1967 to McDowell and Hill, paints of improved wet adhesion are described and in U.S. Pat. No. 3,687,885, issued Aug. 29, 1972 to Abriss and McDowell, paints having improved anti-drip and anti-splattering properties are described. Other patents describe other improvements to latex paints. A property that is desirable in a paint is its stain resistance, whether water-borne or oil-borne, and its ability to be cleaned and have the stains removed. The literature describes additives that can be added to paints to improve stain resistance; however, there is always a need to improve this property without detracting from the other desirable properties of the paint.

SUMMARY OF THE INVENTION

According to the present invention there is provided an aqueous coating composition comprising:

a. an aqueous dispersion of at least one particulate water insoluble copolymer of ethylenically unsaturated monomers of two to 20 carbon atoms containing a water-soluble non-ionic surfactant, said copolymer containing about 0.5 to 10% by weight of ethylenically unsaturated acid monomer units and having a number average molecular weight of at least 50,000;

b. about 0.2 to 10% by weight, based on total solids, of a thickener selected from the group consisting of 1. a copolymer of 99–50% by weight of an $\alpha,\beta$-ethylenically unsaturated carboxylic acid and 1–50% by weight of at least one alkyl acrylate or alkyl methacrylate wherein the alkyl group is from 10 to 30 carbon atoms, 2. a copolymer of 15–99% by weight of acrylic acid or methacrylic acid, 0–30% by weight of an alkyl acrylate or alkyl methacrylate wherein the alkyl group is from 10 to 30 carbon atoms and 1–55% by weight of an ester of the formula

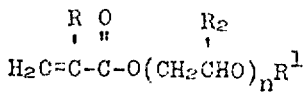

wherein $R^2$ and R are hydrogen or methyl, n is an integer of 6 to 80, and $R^1$ is alkyl of one to 20 carbon atoms or alkylphenyl where the alkyl is from one to 20 carbon atoms, 3. a mixture of (i) 1 to 50 parts by weight of a copolymer of about 2–50% by weight of itaconic anhydride or a compound of the formula

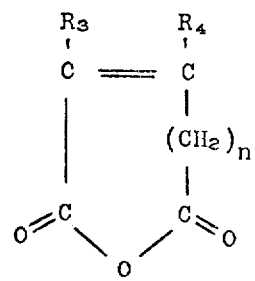

wherein $R_3$ and $R_4$ are hydrogen, halogen, —CN, alkyl of one to six carbons, phenyl, benzyl or a cycloaliphatic radical of three to six carbons, and n is 0 to 3 and about 98–50% by weight of an alkene of two to nine carbons, vinyl acetate, styrene, vinyl chloride, methyl vinyl ether, ethyl vinyl ether, indene, cinnamic acid alkyl ester, acenaphthalene, acrylonitrile or an alkyl ester of acrylic acid or methacrylic acid wherein the alkyl group is one to 18 carbon atoms, with (ii) 1 part by weight of a compound of the formula

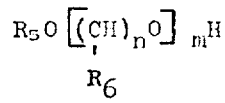

wherein $R_5$ is alkyl of one to 18 carbons or aryl of six to 20 carbons, $R_6$ is H or methyl, n is a positive integer of 1 to 3, and m is a positive integer of 1 to 100, and 4. mixtures thereof;

and c. about 0.01–5% by weight, based on total solids, of a segmented, hybrid fluorine-containing compound, [H] — [F], comprising a balance of the following:

1. one or more [H] segments containing at least one water-solvatable polar group and substantially free from fluorinated aliphatic pendant groups of at least three carbon atoms terminated by trifluoromethyl groups, and in which at least 10% by weight of the [H] segments are the water-solvatable polar groups, and 2. one or more [F] segments substantially free from water-solvatable polar groups, containing from 2 to 85% by weight of three to 30 fully fluorinated carbon atoms terminated by trifluoromethyl groups and providing in the fluorocarbon at least 1% by weight of bound fluorine, the intraconnecting structure of the [F] segments being substantially free of fluorine, said composition having a pH in the range of about 7 to 10.5.

DETAILED DESCRIPTION OF THE INVENTION

The present invention provides aqueous coating compositions which give coatings of enhanced stain resistance and cleanability. It has been found that this improvement is due to the use of a combination of specified thickeners and a broad range of specified fluorocarbon compounds.

The polymers used as the film-forming components of the coating compositions, or binders in the paints, of this invention are described in U.S. Pat. No. 3,687,885, issued to Murray S. Abriss and Maurice J. McDowell on Aug. 29, 1972. These polymers should have about 0.5–10% by weight of ethylenically unsaturated acid monomer units, preferably 1.5–10% and even more preferably 2–3%. These acid monomer units can be provided by such ethylenically unsaturated acids as acrylic acid, methacrylic acid, itaconic acid and its half esters with alkanols, maleic acid and its half esters with alkanols, fumaric acid, crotonic acid, vinyl sulfonic acid, styrene sulfonic acid, and the like. The polymer can have more than one type of acid monomer unit. Acrylic acid and methacrylic acid are preferred because of their availability and the quality of the finishes which are obtained when they are used.

The film-forming components are made by copolymerizing such an acid monomer with one or more other ethylenically unsaturated monomers containing about 2–20 carbon atoms. Illustrative of such other monomers are the esters of acrylic acid and methacrylic acid with alkanols of about 1–20 carbon atoms (such as ethyl acrylate, ethyl methacrylate, methyl methacrylate, 2-ethylhexyl acrylate, butyl acrylate, butyl methacrylate, lauryl acrylate and lauryl methacrylate); butadiene-1,3; acrylonitrile; ethylene; vinyl acetate; vinyl fluoride; vinyl chloride; vinylidene fluoride; vinylidene chloride; and aromatic monomers such as styrene, α-methyl styrene, vinyl toluene and the like. These monomers must of course be copolymerizable with the acid monomers.

As is well known in the art, these monomers can be copolymerized in such proportions and the resulting polymers can be physically blended in such proportions, as to give products with desirable balances of properties. For example, if a more viscous paint is desired, the acid monomer content can be increased. If more complete coalescence at lower temperatures is needed, more of a flexibilizing monomer such as ethyl acrylate or butadiene-1,3 can be used. By thus varying the monomers and their proportions to one another, one skilled in the art can prepare polymers having physical properties which will best suit them for use in the paints of this invention, keeping in mind the substrates to be covered by the paints, the conditions to which they are to be exposed, the sort of protection desired, and like factors.

If desired, the above-described polymers can be iminated according to the disclosure of McDowell and Hill U.S. Pat. No. 3,309,331 issued Mar. 14, 1967. That patent is hereby incorporated by reference for the sole purpose of describing such iminated polymers and how they can be prepared. Paints made with such iminated polymers have good wet adhesion.

If iminated polymers are to be used, they can be prepared according to the disclosure of the above McDowell and Hill patent by reacting enough of an aziridine compound (such as ethyleneimine, 1,2-propyleneimine, or the like) with the above described polymers of ethylenically unsaturated monomers to form thereon about 0.03–3% by weight of pendant radicals represented by the structures

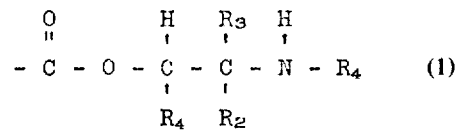

and

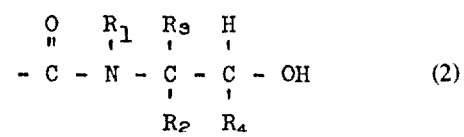

where
R$_1$ can be hydrogen, benzyl or alkyl of 1–5 carbon atoms;
R$_2$ and R$_3$ can be hydrogen, benzyl or alkyl of 1–5 carbon atoms; and
R$_4$ can be hydrogen or alkyl of 1–5 carbon atoms.

These iminated polymers should have at least 1% by weight of free acid monomer units.

Preferred polymers include iminated and non-iminated terpolymers of about 40–50% by weight of an alkyl methacrylate of 4–15 (total) carbon atoms, about 45–59% by weight of an alkyl acrylate of 4–15 (total) carbon atoms and about 1–5% by weight of acrylic acid or methacrylic acid, the total equaling 100%.

Preferred for an interior flat wall paint is a methyl methacrylate/2-ethylhexyl acrylate/methacrylic acid terpolymer whose monomer unit weight percentages are respectively 44/54/2.

Preferred for its resistance to cracking, it good adhesion and coalescence and its resistance to yellowing on aging is a methyl methacrylate/2-ethylhexyl acrylate/methacrylic acid terpolymer whose monomer unit weight percentages are 45/51/4 respectively, iminated to give about 0.03–1.5% by weight of the pendant radicals of formulas (1) and (2). Also preferred for the resistance to soiling it gives the paints is a methyl methacrylate/-2-ethylhexyl acrylate/methacrylic acid terpolymer whose monomer unit percentages are 50/47/3 respectively, iminated to give about 0.03–2.5% by weight of the pendant radicals of formulas (1) and (2).

These copolymers, iminated and non-iminated, should have number average molecular weights of at least about 50,000 or when incorporated with other ingredients to produce a paint, the resulting dry films will tend to not have desirable characteristics. Molecular weights within the range of 200,000 to 5,000,000 are preferred.

The paints of the invention are prepared using the copolymers in the form of aqueous dispersions. This means the copolymers must be "water insoluble." By "water insoluble" is meant that no more than about 2% of the polymer by weight of the water will dissolve in water at 25°C.

These aqueous dispersions contain the copolymers as discrete particles. The particles should have diameters in the range of 0.05–3 microns, preferably 0.1–0.5 micron as measured by electron microscopy. An electronmicrograph is made of a dispersion. From this actual physical measurements of the particle images are made, which are then adjusted for magnification to give particle diameter. The technique is further described in "Emulsion Polymerization" by Bovey, et al., Interscience Publishers, 1955, page 290. Dispersions containing polymer particles smaller than about 0.1 micron are more difficult to stabilize; if the particles are larger than about 0.5 micron, the paints give less satisfactory coalescence and gloss. The dispersions will ordinarily contain about 30–70% by weight of polymer solids.

Aqueous dispersions of copolymers having the proper particle size can be prepared according to conventional emulsion polymerization techniques. According to these techniques, suitable monomers, in the desired proportions, are copolymerized in an aqueous medium containing a surfactant, a polymerization catalyst such as benzoyl peroxide or ammonium persulfate and a reducing agent such as sodium metabisulfite or potassium bisulfite. Polymerization is ordinarily carried out below about 90°C.

Non-ionic surfactants suitable for use in the dispersions can contain as few as about 9–10 moles of oxyalkyl units per mole of active hydrogen containing compound units. However, under most circumstances the non-ionic surfactants will contain about 30 through about 120 moles of oxyalkyl units per mole of active hydrogen containing compound units. Preferably there will be about 40 through about 100 moles of oxyalkyl units per mole of active hydrogen containing compound units and even more preferably about 40 through about 70 moles of oxyalkyl units per mole of active hydrogen containing compound units.

Preferred non-ionic surfactants include polyoxyalkylated nonyl phenol and polyoxyalkylated octyl phenol. Especially preferred are polyoxyethylated octyl phenol and polyoxyethylated nonyl phenol (i.e., the reaction product of octyl phenol or nonyl phenol with ethylene oxide). The surfactants are used in amounts known to those skilled in the art, generally less than 10% by weight of the composition.

The thickeners useful in the present invention not only thicken the paint, but it has been found that these thickeners also contribute to stain resistance. There are three types of polymeric thickeners that can be used either alone or in combination at a concentration of about 0.2 to 10% by weight of the solids, preferably about 0.5 to 5% by weight.

The first useful thickener is a copolymer of 99–50% by weight (preferably 99–85%, most preferably 97–90) of an $\alpha,\beta$-ethylenically unsaturated carboxylic acid and 1–50% by weight (preferably 1.15%, most preferably 3–10%) of at least one alkyl acrylate or alkyl methacrylate wherein the alkyl group is from 10 to 30 carbon atoms. These copolymeric thickeners are described in U.S. Application Ser. No. 372,844, filed June 22, 1973 in the names of Michael Fryd and Achim R. Krueger and assigned to the assignee of the present application. While any $\alpha,\beta$-ethylenically unsaturated mono or dicarboxylic acid may be used, e.g., maleic acid, fumaric acid, itaconic acid, glutaconic acid, crotonic acid, angelic acid, etc., acrylic acid and methacrylic acid are especially preferred. Stearyl methacrylate is the preferred alkyl methacrylate. The thickeners are prepared by conventional addition polymerization techniques using customary polymerization catalysts such as azobisisobutyronitrile, benzoyl peroxide and the like in the usual amounts.

The second useful thickener is a copolymer of about 15–99% by weight (preferably about 25–94%, most preferably 35–90%) of acrylic acid or methacrylic acid, 0.30% by weight (preferably about 1–25%, most preferably about 5–15%) of an alkyl acrylate or alkyl methacrylate wherein the alkyl group is from 10 to 30 carbon atoms (stearyl methacrylate is preferred) and 1–55% by weight (preferably about 5–50%) of an ester of the formula:

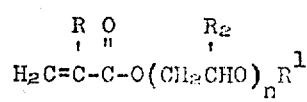

wherein
$R_2$ and $R$ are hydrogen or methyl,
$n$ is an integer of 6 to 80, and
$R^1$ is alkyl of 1–20 carbon atoms or alkylphenyl where the alkyl group is from one to 20 carbon atoms (preferably eight to 20 carbon atoms).

A preferred ester has the formula:

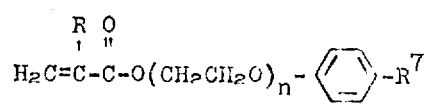

wherein
$R$ is hydrogen or methyl,
$n$ is an integer of 6 to 80, and
$R^7$ is an alkyl group of eight to 20 carbon atoms.

Up to 10% by weight of other monomers such as bis(chloroethyl)-vinyl phosphonate can optionally be copolymerized with the above-described monomers.

Particularly preferred thickeners of the second type use methacrylic acid, stearyl methacrylate and an acrylate of the formula:

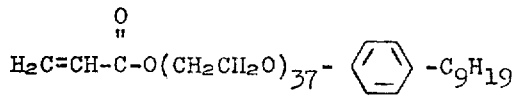

as monomers.

The third useful thickener is a mixture of (i) 1 to 50 parts by weight of a copolymer of about 2–50% by weight of itaconic anhydride or a compound of the formula

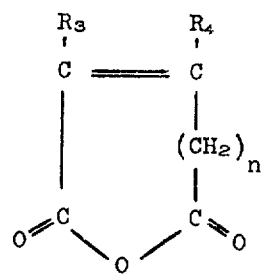

wherein
$R_3$ and $R_4$ are hydrogen, halogen, —CN, alkyl of one to six carbons, phenyl, benzyl or a cycloaliphatic radical of three to six carbons, and
$n$ is 0 to 3 and about 98–50% by weight of an alkene of two to nine carbons, vinyl acetate, styrene, vinyl chloride, methyl vinyl ether, ethyl vinyl ether, indene, cinnamic acid alkyl ester, wherein the alkyl is of one to four carbon atoms, acenaphthalene, acrylonitrile or an alkyl ester of acrylic acid or methacrylic acid wherein the alkyl group is one to 18 carbon atoms, with (ii) 1 part by weight of a compound of the formula

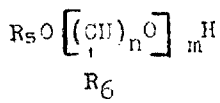

wherein
$R_5$ is alkyl of one to 18 carbons or aryl of six to 20 carbons,
$R_6$ is H or methyl,
$n$ is a positive integer of 2 or 3, and
$m$ is a positive integer of 1 to 100.

Preferred are materials which can be obtained from General Aniline and Film Corporation as "Thickener L" or "Thickener LN." These products are stated to be partial esters of 2 parts of a methyl vinyl ether/maleic anhydride 1/1 copolymer and 1 part of a polyoxyethylated lauryl alcohol having 16 moles of ethylene oxide units per mole of alcohol units. "Thickener L" is a potassium salt and "Thickener LN" is an ammonium salt.

These products can be prepared according to the methods set forth in U.S. Pat. No. 3,301,829 and U.S. Pat. No. 3,306,863.

A new thickener introduced by the Dow Chemical Co. (coded XD-7846) is useful in the present invention. The composition of this thickener is unknown but it is believed to be a polyelectrolyte of the Thickener L and LN types described above which uses styrene as a monomer. For the purposes of the present invention, it is considered to be the third type of thickener.

The fluorine-containing compounds useful in combination with the thickeners can be one or more of many such compounds described in the literature to give stain repellency and/or even water repellency to many substrates. A concentration of about 0.01 to 5% by weight, based on solids, is generally used with a concentration of about 0.02 to 1% by weight being preferred.

There are two important requirements of the fluorine-containing compound — (1) it must have one or more segments containing at least one water-solvatable polar group for water solubility and (2) it must have one or more segments containing fully fluorinated carbon atoms for aiding in stain resistance. Thus, the fluorine-containing compound, is a segmented, hybrid fluorine-containing compound, [H] — [F], comprising a balance of the following:

1 one or more [H] segments containing at least one water-solvatable polar group and substantially free from fluorinated aliphatic pendant groups of at least three carbon atoms terminated by trifluoromethyl groups, and in which at least 10% by weight of the [H] segments are the water-solvatable polar groups, and 2 one or more [F] segments substantially free from water-solvatable polar groups, containing from 2 to 85% by weight of three to 30 fully fluorinated carbon atoms terminated by trifluoromethyl groups and providing in the fluorocarbon at least 1% by weight of bound fluorine, the intraconnecting structure of the [F] segments being substantially free of fluorine, said composition having a pH in the range of about 7 to 10.5.

The fluorine-containing compounds known in the art and useful herein can be cationic (e.g., Example 4), anionic (e.g., Example 2), amphoteric (e.g., Example 6) or carboxylic (e.g., Example 8). A good description of fluorine-containing compounds useful herein is contained in U.S. Pat. No. 3,574,791, issued Apr. 13, 1971 to Patsy O. Sherman and Samuel Smith, the disclosure of which is hereby incorporated by reference. While none of the copolymers described therein are preferred for use in the present invention, the definition presented (as modified) does adequately describe the useful fluorine-containing compounds.

Preferred fluorine-containing compounds are described in U.S. Pat. No. 3,083,224, issued Mar. 26, 1963 to Neal O. Brace and Alan K. Mackenzie, the disclosure of which is hereby incorporated by reference. The compounds therein described are anionic phosphates of the formula:

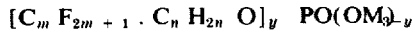

wherein
$n$ is an integer of 1 to 16 inclusive,
$m$ is an integer of 4 to 12 inclusive, provided $C_m$ and $C_n$ jointly contain a straight chain of not less than eight carbon atoms,
$y$ is a number of average value of 1 to 2.5, and
M is a cation selected from the group consisting of hydrogen, alkali metal, ammonium and substituted ammonium.

M in the formula is preferably ammonium or a diethanolamine substituted ammonium salt. An especially preferred material has the formula:

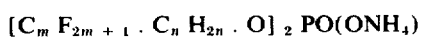

wherein
$n$ is an integer of 2 to 12 inclusive, and
$m$ is an integer of 4 to 8 inclusive provided $C_m$ and $C_n$ jointly contain a straight chain of not less than eight carbons.

Other useful anionic phosphate, fluorine-containing compounds are described in U.S. Pat. No. 3,188,340, issued June 8, 1965, to Alan K. Mackenzie which is hereby incorporated by reference. The described materials have the formula:

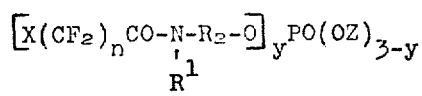

wherein
X is H or F, preferably F,
$n$ is an integer of 6 to 12,
$R_1$ is hydrogen or alkyl of one to four carbon atoms, $R_2$ is alkylene of two to 12 carbon atoms, and Z is hydrogen, alkali metal, ammonium or substituted ammonium.

Another phosphate fluorine-containing compound is described in U.S. Pat. No. 3,094,547, issued June 18, 1963 to Richard F. Heine, the disclosure of which is hereby incorporated by reference. These described compounds have the formula:

$$[R_fSO_2N(R)R^1O]_mPO(X)_{3-m}$$

wherein $R_f$ is perfluoroaliphatic $C_nF_{2n+1}$ or perfluorocycloaliphatic $C_nF_{2n-1}$ where $n$ is an integer of 3 to 18, R is hydrogen or alkyl of one to 12 carbon atoms, $R^1$ is alkylene of two to 12 carbon atoms, $m$ is an integer of 1 to 3, and X is hydroxyl or $ONH_4$.

Still other fluorine-containing phosphates are described in U.S. Pat. No. 3,492,374, issued Jan. 27, 1970, to Ronald E. LeBleu and John H. Fassnacht, the disclosure of which is hereby incorporated by reference. These phosphates have the formula:

$$[XCF_2CF_2O(CFXCF_2O)_xCFXCH_2O]_2PO(OM)$$

wherein

X is fluorine or trifluoromethyl, $x$ is an integer of 1 to 8, and

M is a water-solubilizing cation such as alkali metal, ammonium or substituted ammonium.

U.S. Pat. No. 3,274,244, issued Sept. 20, 1966, to Alan K. Mackenzie also describes fluorine-containing phosphate compound. The disclosure of this patent is also incorporated by reference. These phosphates have the formula:

$$\left[F(CFCF_2O)_n\underset{R_1}{CFCONR_2O}\right]_2POM$$

wherein

X is —F or —$CF_3$, $n$ is an integer of 2 to 6, $R_1$ is hydrogen or alkyl of one to four carbon atoms, $R_2$ is alkylene of two to four carbon atoms, and M is a water solubilizing cation such as hydrogen, alkali metal, ammonium and substituted ammonium (particularly by diethanolamine).

British Pat. Specification No. 1,297,085 describes fluorine-containing phosphate compounds of the formula:

$$(R_fC_6F_{10}C_nH_{2n}O)_aPO(X)_{3-a}$$

wherein $R_f$ is fluorine or a $C_1$ to $C_4$ perfluoroalkyl group, $n$ is an integer of 1 to 4, $a$ is a number average from 1 to 2.5, and X is chlorine or OM where M is hydrogen, alkali metal, ammonium or substituted ammonium.

This patent is also hereby incorporated by reference.

U.S. Pat. No. 3,112,241, issued Nov. 26, 1963, to Alan K. Mackenzie and U.S. Pat. No. 3,692,885, issued Sept. 19, 1972, to Louis G. Anello et al. describe further fluorine-containing phosphates. Their disclosures are also hereby incorporated by reference.

Other useful fluorine-containing compounds are sulfates of the formula;

$$R_fCH_2CH_2O(CH_2CH_2O)_xSO_3{}^-Na^+$$

wherein $R_f$ is $F(CF_2)_n$ where $n$ is an integer of 3 to 20, and $x$ is an integer of about 5 to 20.

Alkali metal ions other than sodium can be used, especially potassium.

Carboxylate fluorine-containing compounds are also useful. These compounds generally comprise a copolymer of about 50 to 90% by weight (70 to 80% preferred) of a compound of the formula:

$$R_fCH_2CH_2OC-CR=CH_2 \quad (ZFM)$$

wherein $R_f$ is $F(CF_2)_n$ where $n$ is an integer of 3 to 20, and

R is hydrogen or methyl;

and 50 to 40% by weight (30 to 20% preferred) of acrylic acid or methacrylic acid. Terpolymers and tetrapolymers (or higher) of a similar type are also useful. Representative polymers are about 5 to 10% by weight of ZFM defined above, and 5 to 80% by weight of at least one alkyl acrylate or alkyl methacrylate where the alkyl group is from one to 16 carbon atoms and about 10 to 90% by weight of a mono or dicarboxylic such as acrylic acid, methacrylic acid or itaconic acid. Illustrative of such polymers are 10% ZFM/50% butyl acrylate/30% methyl methacrylate/10% itaconic acid and 5–10% ZFM/5–10% stearyl methacrylate/80–90% methacrylic acid.

Other carboxylate, fluorine-containing compounds have the formula:

$$R_fCH_2CH_2SCH_2CH_2N^+(CH_2)_2CH_2CO_2{}^-$$

and $$R_fCH_2CH_2SCH_2CH_2CO_2Na$$

wherein $R_f$ is $F(CF_2)_n$ where $n$ is an integer of 3 to 20.

A useful anionic fluorine-containing compound has the formula:

$$R_fCH_2CH_2SCH_2CH_2N^+(CH_3)_3(CH_3OSO_3{}^-)$$

wherein $R_f$ is $F(CF_2)_n$ where $n$ is an interger of 3 to 20.

Non-ionic compounds include polyethylene oxide adducts of the formula:

$$R_fCH_2CH_2O(CH_2CH_2O)_xH$$

wherein $R_f$ is $F(CF_2)_n$ where $n$ is an integer of 3 to 20, and $x$ is an integer of 1 to 20;

titanates of the formula:

$$(R_fCH_2CH_2O)_4Ti$$

and $$(R_fCH_2CH_2O)_2Ti(OR)$$

wherein $R_f$ is $F(CF_2)_n$ where $n$ is an integer of 3 to 20, and

R is alkyl of 1 to 4; and carboxylic esters of the formula:

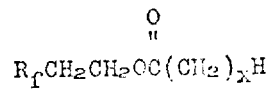

wherein x is an integer of 0–18 (preferably 2 to 18),

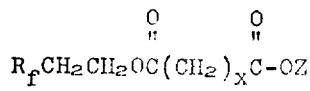

wherein
x is an integer of 0–10 (preferably 2 to 10),
Z is —$CH_2CH_2R_f$, hydrogen or ammonium, and
$R_f$ in all formulas is $F(CF_2)_n$ where $n$ is an integer of 3 to 20.

In preparing paints, pigments as well as other conventional paint ingredients can be added to the coating composition of the invention. Conventional pigments can be used in the paints of the invention, either alone or in combination. Illustrative are rutile titanium dioxide, anatase titanium dioxide, carbon black, lamp black, finely divided kaolin clays, chrome yellow, chrome green, black iron oxide, "Monastral" green pigment, "Monastral" blue pigment, "Dalamar" yellow pigment, lithopone, and the like. These pigments can be extended with conventional extenders such as diatomaceous silica, calcium carbonate, barium sulfate, talc, various clays, mica, and the like.

The degree of gloss of the paints of the invention is governed by the pigment volume concentration (defined as the percent of pigment (by volume) in a dried film of the paint) of the paint and the particle size (measured by electron microscopy) of the extender used. Although the following figures and ranges tend to overlap somewhat, it should be understood that, in a general way, they define semi-gloss and flat paints and that the actual values will depend on the pigments and film-forming polymers being used and the degree of gloss desired. The proper selection can easily be made by one skilled in this art.

Generally, the flat paints will have pigment volume concentrations of 30–70% and the particles of the extenders will have diameters ranging from 0.01–200 microns. The semi-gloss paints will have pigment volume concentrations of 10–35% and the particles of the extenders will have diameters ranging from 0.01–10 microns. While these are broad ranges, it is preferred that the pigment concentration of the paints of the invention be in the range of 10 to 65% by weight of the solids in the composition, preferably 15 to 50% by weight.

Other conventional paint adjuncts can also be added to the paints of the invention. For example, glycols such as ethylene glycol and propylene glycol can be added to the paints, at concentrations of up to 30% by weight, to increase their wet-edge time and to further improve their lapping characteristics. Defoamers, pigment dispersants and microbiocides can also be added, in the usual amounts.

Ordinarily, the paints of this invention have pH value of 7–8 to 10.5, preferably 9–9.8. The pH values are ordinarily, but not necessarily, brought to within these ranges by including in the paints about 0.0035–0.7 milliequivalents of a base per gram of paint. For acrylic latex paints, the lower pH value is usually 8; however, for vinyl acetate based paints, the pH can be as low as 7.

Suitable bases include sodium hydroxide, potassium hydroxide, and volatile nitrogenous base having a vapor pressure greater than about $1 \times 10^{-4}$ millimeters of mercury at 25°C. such as ammonia, monoethanolamine, diethanolamine, propanolamine, morpholine, pyrrolidine, or piperidine. Ammonia is preferred for its volitility and low cost.

The invention can be further understood by the following examples in which parts and percentages are by weight unless otherwise indicated.

EXAMPLES 1–7

A base, semi-gloss paint was prepared having the following composition:

| Ingredients | % by Weight |
|---|---|
| Titanium dioxide | 27.3 |
| Tributyl phosphate | 0.2 |
| Thickener MAA/SMA (95/5) copolymer[1] | 0.6 |
| Binder MMA/2EHA/MAA/AEMA (47.5/49.5/2.5/0.5)[1] | 16.1 |
| Potassium tripolyphosphate | 0.2 |
| Defoamer ("DeeFo" 495) | 0.1 |
| Preservative (a zinc pyridine thione) | 0.01 |
| Colloids 581-B defoamer | 0.2 |
| Hexahydro 1,3,5-triethyl-S-triazine | 0.09 |
| Non-ionic surfactant ("Triton" X-100)[2] | 0.2 |
| Sodium polycarboxylate | 0.2 |
| Ammonia | 0.6 |
| Water | 46.5 |
| Ethylene glycol | 0.1 |
| Propylene glycol | 7.6 |
| | 100.00 |

[1]MMA = methyl methacrylate
SMA = stearyl methacrylate
2EHA = 2-ethylhexyl acrylate
MAA = methacrylic acid
AEMA = aminoethyl methacrylate

[2]$H_3C(CH_2)_7$— ⌬ —O $+$ $H_2C..CH_2$—O $+$ H where n is about 9–10 available from Rohm and Haas Co.

The resulting base paint with thickener, but no fluorocarbon, had about 46% solids, a pigment volume concentration (PVC) of about 29 and a pH of about 9.5. To this base paint was added about 0.03 parts of various fluorocarbons per 100 parts of base paint. The fluorocarbons are listed in Table I.

TABLE I

| Example No. | Fluorocarbon |
|---|---|
| 1 | $(R_fCH_2CH_2O)_{1-2}P(O^-NH_4^+)_{2-1}$ |
| 2 | $R_fCH_2CH_2O(CH_2CH_2O)_{11}SO_3^-Na^+$ |
| 3 | $(C_8F_{17}SO_2N$—$CH_2CH_2O)_2PO_2^-NH_4$<br>\|<br>$C_2H_5$ |
| 4 | $R_fCH_2CH_2SCH_2CH_2N^+(CH_3SO_4)^-$<br>\|<br>$(CH_3)_3$ |
| 5 | $R_fCH_2CH_2O(CH_2CH_2O)_{-11}H$ |
| 6 | $R_fCH_2CH_2SCH_2CH_2N^+$—$CH_2CO_2^-$<br>\|<br>$(CH_3)_2$ |
| 7 | $(R_fCH_2CH_2O)_xTi$ (May be partially hydrolyzed in the paint) |

$R_f = F(CF_2)_n$ where n is a mixture of 6, 8, 10 and higher (12%).

The base paint and each paint of Examples 1–7 was applied to a panel and allowed to air dry. The panels were placed adjacent each other on a substrate and then marked with crayon, china marker and oil dag. Ease of cleaning was tested by applying a detergent to the panels and rubbing across all of them at the same time with a sponge. Rubbing was continued until significant differences were noted between panels using visual subjective examination. Semi-gloss paint usually takes fewer strokes than flat paint. Each panel was then rated visually against the others and given a subjective score ranging between 1 (mark substantially completely removed) and 5 (mark substantially unremoved). The scores for the panels are shown in Table II.

TABLE II

| Mark | Example No. | | | | | | | |
|---|---|---|---|---|---|---|---|---|
| | Base | 1 | 2 | 3 | 4 | 5 | 6 | 7 |
| Crayon | 5 | 1 | 1 | 1 | 1 | 1 | 1 | 3 |
| China marker | 5 | 1 | 1 | 1 | 1 | 1 | 1 | 3 |
| Oil dag | 5 | 1 | 1 | 1 | 1 | 1 | 1 | 3.5 |

It can be seen from Table II that the base paint with thickener, but no fluorocarbon, did not clean up while the paints containing a fluorocarbon additive had most of the marks removed.

EXAMPLES 8–12

A base, flat paint was prepared having the following composition:

| Ingredients | % by Weight |
|---|---|
| Titanium dioxide | 19.1 |
| Aluminum silicate | 10.9 |
| Thickener MAA/SMA (95/5) copolymer | 0.3 |
| Binder MMA/2EHA/MAA/AEMA (45/53/1.5/0.5) copolymer | 13.6 |
| Defoamer ("DeeFo" 495) | 0.3 |
| Gelling agent ("Benton" LT) | 0.3 |
| Preservative (a benzyl sulfoamine) | 0.01 |
| Non-ionic surfactant ("Triton" X-100) | 0.02 |
| Sodium polycarboxylate | 0.6 |
| Non-ionic surfactant ("Triton" X-405)[1] | 0.16 |
| Ammonia | 0.41 |
| Water | 44.0 |
| Ethylene glycol | 7.0 |
| Propylene glycol | 1.8 |
| Odorless mineral spirits | 1.5 |
| | 100.00 |

[1]$H_3C(CH_2)_7-$  $-O+H_2C..CH_2-O+_nH$ where n is about 45 available from Rohm and Haas Co.

The resulting base paint with thickener, but no fluorocarbon, had about 45% solids, a PVC of about 40 and a pH of about 9.5. To this base paint was added various fluorocarbons. The fluorocarbons and their concentration per 100 parts of base paint are shown in Table III.

TABLE III

| Ex. No. | Conc. (pts. by wt.) | Fluorocarbon |
|---|---|---|
| 8 | 0.13 | $R_fCH_2CH_2OC-C=CH_2/MAA$ (70/30) <br> ‖ ‖ <br> O CH$_3$ |
| 9 | 0.14 | $R_fCH_2CH_2O(CH_2CH_2O)_{11}SO_3^-Na^+$ |
| 10 | 0.13 | $R_fCH_2CH_2O(CH_2CH_2O)_{11}H$ |
| 11 | 0.2 | $R_fCH_2CH_2SCH_2CH_2N^+CH_2CO_2^-$ <br> ｜ <br> $(CH_3)_2$ |
| 12 | 0.14 | $(R_fCH_2CH_2O)_{1-2}P(O^-NH_4^+)_{2-1}$ |
| 13 | 0.14 | $(C_8F_{17}SO_2N-CH_2CH_2O)_2PO_2^-NH^+$ <br> ｜ <br> $C_2H_5$ |

$R_f$ = same as in Table I.

Painted panels were prepared, marked, cleaned and evaluated as in Examples 1–7. Scores for the panels are shown in Table IV.

TABLE IV

| Mark | Example No. | | | | | | |
|---|---|---|---|---|---|---|---|
| | Base | 8 | 9 | 10 | 11 | 12 | 13 |
| Crayon | 5 | 1 | 1 | 1 | 3.5 | 1 | 1 |
| China marker | 5 | 1 | 1 | 1 | 3.5 | 1 | 1 |
| Oil dag | 5 | 2 | 1 | 1 | 1 | 1 | 1 |

EXAMPLE 14–17

A base, flat paint was prepared having the following composition:

| Ingredients | % by Weight |
|---|---|
| Monastral blue pigment | 0.1 |
| Titanium dioxide | 19.1 |
| Aluminum silicate | 10.8 |
| Thickener MAA/SMA/NPEOA/VP copolymer[1] (77.5/2.5/10/10) | 0.3 |
| Binder MMA/2EHA/MAA/AEMA 1 (45/53/1.5/0.5) | 13.6 |
| Defoamer ("DeeFo" 495) | 0.3 |
| Gelling agent ("Benton" LT) | 0.3 |
| Preservative (a benzyl sulfoamine) | 0.01 |
| Non-ionic surfactant ("Triton" X-100) | 0.02 |
| Sodium polycarboxylate | 0.6 |
| Non-ionic surfactant ("Triton" X-405) | 0.16 |
| Ammonia | 0.41 |
| Water | 44.0 |
| Ethylene glycol | 7.0 |
| Propylene glycol | 1.8 |
| Odorless mineral spirits | 1.5 |
| | 100.00 |

[1]NPEOA = $H_2C=CHC-O(CH_2CH_2O)_{37}-$  $-C_9H_{19}$
‖
O

VP = Bis(chloroethyl)vinylphosphonate

The resulting base paint with thickener, but no fluorocarbon, had about 45% solids, a PVC of about 40 and a pH of about 9.5. To this base paint was added various fluorocarbons. The fluorocarbons and their concentration per 100 parts of base paint are shown in Table V.

TABLE V

| Example No. | Conc.(pts. by wt.) | Fluorocarbon |
|---|---|---|
| 14 | 0.13 | Same as Example 1 |
| 15 | 0.13 | Same as Example 3 |
| 16 | 0.13 | Same as Example 6 |
| 17 | 0.14 | Example 1 modified with diethanol amine* |

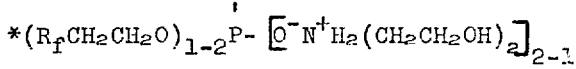

Painted panels were prepared, marked, cleaned and evaluated as in Examples 1–7. Scores for the panels are shown in Table VI.

TABLE VI

| Mark | Example No. | | | | |
|---|---|---|---|---|---|
| | Base | 14 | 15 | 16 | 17 |
| Crayon | 5 | 3 | 3 | 5 | 3 |
| China marker | 5 | 3.5 | 3.5 | 5 | 3 |
| Oil dag | 5 | 2 | 2 | 3 | 2 |

EXAMPLES 18–20

The base, semi-gloss paint used in Examples 1–7 was used in the present examples. To the base paint was added 0.032 part (Example 18), 0.016 part (Example 19) and 0.008 part (Example 20) of the fluorocarbon additive of Example 1 per 100 parts of base paint.

Painted panels were prepared, marked, cleaned and evaluated as in Examples 1–7. Scores for the panels are shown in Table VII.

TABLE VII

| Mark | Example No. | | | |
|---|---|---|---|---|
| | Base | 18 | 19 | 20 |
| Crayon | 5 | 1 | 1 | 2 |
| China marker | 5 | 1 | 1 | 1 |
| Oil dag | 5 | 1 | 1 | 1 |

EXAMPLE 21

The base, semi-gloss paint used in Examples 1–7 was used in this example except the thickener was replaced by the same amount of a thickener which was a copolymer of 87.5% MAA, 2.5% SMA and 10% of an acrylate of the formula:

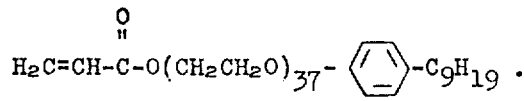

To this paint was added 0.032 part of the fluorocarbon additive of Example 1. The evaluated panel scored 1, 1 and 1 for crayon, china marker and oil dag.

EXAMPLE 22

The base, semi-gloss paint used in Examples 1–7 was used in this example except the binder was replaced by the same amount of a copolymer of 47.5% MMA, 49.5% 2EHA and 3% MAA. The resulting paint when applied to a panel and evaluated as described previously scored 5, 5 and 5 for crayon, china marker and oil dag.

When 0.032 part of the fluorocarbon compound of Example 1 was added to the above-described paint, the evaluated panel was scored 1, 1 and 1.

EXAMPLE 23 a base, semi-gloss paint was prepared having the following approximate composition:

| Ingredients | % by Weight |
|---|---|
| Titanium dioxide | 27.9 |
| Tributyl phosphate | 0.2 |
| Thickener MAA/SMA (95/5) copolymer | 0.93 |
| Binder MMA/2EHA/MAA (44/54/2) copolymer | 19.9 |
| Potassium tripolyphosphate | 0.2 |
| Preservative (a zinc pyridine thione) | 0.01 |
| Gelling agent (Colloids 581-B) | 0.2 |
| Non-ionic surfactant ("Triton" X-100) | 0.17 |
| Sodium polycarboxylate | 0.21 |
| Non-ionic surfactant ("Triton" X-405) | 0.64 |
| Ammonia | 1.3 |
| Water | 40.3 |
| Ethylene glycol | 0.44 |
| Propylene glycol | 7.6 |
| | 100.00 |

The resulting base paint had about 50% solids, a PVC of about 25 and a pH of about 9.5.

This paint when applied to a panel and evaluated as described previously scored 5, 5 and 5 for crayon, china marker and oil dag. When 0.046 part of the fluorocarbon compound of Example 1 was added to the paint, the evaluated panel was scored 1, 1 and 1.

EXAMPLE 24

The binder in the base paint of Example 23 was replaced by the same amount of a binder which was a copolymer of 45% MMA, 53% 2EHA, 1.5% MAA and 0.5% AEMA. This paint when applied to a panel and evaluated as described previously scored 5, 5 and 5 for crayon, china marker and oil dag. When 0.046 part of the fluorocarbon compound of Example 1 was added to this paint, the evaluated panel was scored 1, 1 and 1.

EXAMPLES 25–33

A base, semi-gloss paint, without thickener and fluorocarbon compound, was prepared having the following approximate composition:

| Ingredients | % by Weight |
|---|---|
| Titanium dioxide | 23.9 |
| Tributyl phosphate | 0.2 |
| Binder MMA/2EHA/MAA/AEMA (47.5/49.5/2.5/0.5) copolymer | 14.2 |
| Potassium tripolyphosphate | 0.2 |
| Preservative (a zinc pyridine thione) | 0.01 |
| Gelling agent (Colloids 581-B) | 0.2 |
| Non-ionic surfactant ("Triton" X-100) | 0.15 |
| Sodium polycarboxylate | 0.2 |
| Ammonia | 0.8 |
| Water | 53.7 |
| Ethylene glycol | 0.04 |
| Propylene glycol | 6.4 |
| | 100.00 |

TABLE VIII

| Example No. | Thickener | Conc. pts./ 100 base | Cleaning Scores | | | Cleaning Scores with 0.024 Parts Fluorocarbon | | |
|---|---|---|---|---|---|---|---|---|
| | | | Crayon | China Marker | Oil dag | Crayon | China Marker | Oil dag |
| Base | — | — | 5 | 5 | 3 | 3 | 4 | 2 |
| 25 | Ex. 1 | 0.16 | 5 | 5 | 2 | 2 | 3 | 1 |
| Control₁ | Methocel | 0.16 | 5 | 5 | 2 | 2 | 3.5 | 2 |
| 26 | LN* | 0.16 | 5 | 5 | 2 | 1 | 2 | 1 |
| 27 | Ex. 21 | 0.16 | 5 | 5 | 2 | 1 | 2 | 1 |
| 28 | Ex. 1 | 0.32 + 11 water | 4 | 5 | 3 | 1 | 1 | 1 |
| Control₂ | Methocel | 0.32+ 11 water | 3 | 3 | 2 | 2 | 2 | 1.5 |
| 29 | LN | 0.32+ 11 water | 4 | 5 | 2 | 1 | 1 | 1 |
| 30 | Ex. 21 | 0.32+ 11 water | 5 | 5 | 3 | 1 | 1 | 1 |
| 31 | Ex. 1 | 0.73+ 23 water | 4 | 4 | 3 | 1 | 1 | 1 |
| Control₃ | Methocel | 0.73+ 23 water | 2 | 2 | 1.5 | 2 | 2 | 1 |
| 32 | LN | 0.73+ 23 water | 2 | 2 | 1.5 | 1 | 1 | 1 |
| 33 | Ex. 21 | 0.73+ 23 water | 2 | 2 | 3 | 1 | 1 | 1 |

*LN=Thickener LN, the ammonium salt of a mixture of 2 parts of a copolymer of 50% methyl vinyl ether and 50% maleic anhydride with 1 part of a polyoxyethylated lauryl alcohol having 16 moles of ethylene oxide units per mole of alcohol units.

The resulting base paint had about 39% solids, a PVC of about 29 and a pH of about 9.5.

Various paints were prepared from the above base paint with different thickeners at varying concentrations with and without the fluorocarbon compound of Example 1. The resulting paints were applied to panels and evaluated as described previously. The thickeners, their concentration and evaluation scores (with and without fluorocarbon) are shown in Table VIII.

It can be seen from Table VIII that a difference in evaluation scores is obtained when the fluorocarbon is added to all of the thickeners except methocel. With methocel, not much difference in score is observed. Also, with just the thickener present, there is not much difference in score observed over the base paint.

EXAMPLES 34–40

A base flat paint, without thickener and fluorocarbon compound, was prepared having the following approximate composition:

| Ingredients | % by Weight |
|---|---|
| Titanium dioxide | 23.9 |
| Aluminum silicate | 13.6 |
| Binder MMA/2EHA/MAA/AEMA (45/53/1.5/0.5) | 19.6 |
| Defoamer ("DeeFo" 495) | 0.2 |
| Gelling agent ("Benton" LT) | 0.4 |
| Preservative (1,2-benzisothiazolin-3-one) | 0.01 |
| Sodium polycarboxylate | 0.69 |
| Ammonia | 0.1 |
| Water | 39.8 |
| Ethylene glycol | 1.7 |
| | 100.00 |

This resulting base paint had about 42% solids, a PVC of about 38 and a pH of about 9.5. To this paint was added 0.075 part of the fluorocarbon (FC) of Example 1 and/or 0.31 part of various thickeners.

Painted panels were prepared, marked, cleaned and evaluated as in Examples 1–7. The thickeners used and scores for the panels are shown in Table IX.

TABLE IX

| Example No. | FC | Thickener | Mark | | |
|---|---|---|---|---|---|
| | | | Crayon | China marker | Oil dag |
| Control | No | — | 5 | 5 | 4 |
| Control | Yes | — | 5 | 5 | 3 |
| Control | No | Example 21 (80/10/10) | 5 | 5 | 3 |
| 34 | Yes | " | 1 | 1 | 1 |
| Control | No | MAA/SMA(90/10) | 4 | 5 | 3 |
| 35 | Yes | " | 1 | 1 | 1 |
| Control | No | Example 21 (85/10/5) | 4 | 5 | 2.5 |
| 36 | Yes | " | 1 | 1 | 1 |
| Control | No | Example 21 (40/10/50) | 4 | 5 | 3 |
| 37 | Yes | " | 1 | 1 | 1 |
| Control | No | MAA/acrylate(Ex.21) (50/50) | 4 | 5 | 4 |
| 38 | Yes | " | 1 | 1 | 1 |
| Control | No | MAA/SMA(95/95) | 5 | 5 | 2.5 |
| 39 | Yes | " | 2 | 2 | 1 |
| Control | No | Dow XD-7846.01* | 3.5 | 5 | 2 |
| 40 | Yes | " | 1 | 1 | 1 |

*A thickener sold by Dow Chemical Co. which is thought to be similar to thickener LN used in Examples 26, 29 and 32.

EXAMPLE 41

A base, semi-gloss paint was prepared having the following approximate composition:

| Ingredients | % by Weight |
| --- | --- |
| Titanium dioxide | 38.9 |
| Tributyl phosphate | 0.3 |
| Binder MMA/2EHA/MAA/AEMA (47.5/49.5/2.5/0.5) | 19.6 |
| Potassium tripolyphosphate | 0.3 |
| Preservative (a zinc pyridine thione) | 0.01 |
| Gelling agent (Colloids 581-B) | 0.3 |
| Non-ionic surfactant ("Triton" X-100) | 0.2 |
| Sodium polycarboxylate | 0.29 |
| Water | 36.8 |
| Propylene glycol | 3.3 |
| | 100.00 |

This resulting base paint had about 42% solids, a PVC of about 33 and a pH of about 9.5. To a portion of this base paint was added 0.57 part of the thickener of Example 1, to another portion 0.8 part of the fluorocarbon of Example 17 and to a third portion the same amounts of both the thickener and fluorocarbon.

After painting, marking and cleaning panels as in Examples 1–7, the panel painted with base paint scored 5,5,5 for crayon, china marker and oil dag respectively, while (1) the panel painted with base paint with thickener added scored 2,3,5, (2) the panel painted with base paint with fluorocarbon added scored 4,4,2 and (3) the panel painted with base paint with both thickener and fluorocarbon added scored 1,1,1.

EXAMPLE 42

To portions of the base paint of Example 41 was added (1) 0.032 part of the fluorocarbon of Example 1, (2) 0.57 part of the thickener used in Examples 1–7 and (3) 0.032 part fluorocarbon and 0.57 part thickener, respectively. Panels painted, marked and cleaned as in Examples 1–7 scored (1) 4.5, 4.5, 1; (2) 2,3,5; and (3) 1,1,1 respectively.

EXAMPLE 43

A base, clear coating composition having a pH of about 9.5 was prepared having the following approximate composition:

| Ingredients | % by Weight |
| --- | --- |
| Binder MMA/2EHA/MAA/AEMA (47.5/49.5/2.5/0.5) | 21.7 |
| Non-inic surfactant ("Triton" X-100) | 0.01 |
| Ammonia | 1.82 |
| Water | 65.6 |
| Ethylene glycol | 0.06 |
| Propylene glycol | 10.81 |
| | 100.00 |

To portions of the base composition was added (1) 1.89 parts of the thickener of Examples 1–7, (2) 0.035 part of the fluorocarbon of Example 1, and (3) 0.035 part of fluorocarbon and 1.89 parts thickener, respectively.

A panel coated with the base composition, marked and cleaned as in Examples 1–7, scored 5,5,5. Panels, also so prepared with compositions (1), (2) and (3) above and then marked and cleaned, scored (1) 2.5, 3, 1; (2) 4.5, 4, 1; and (3) 1,1,1.

EXAMPLE 44

To the base coating composition of Example 43 was added 1.89 parts of methocel, the thickener of Example 21 or the thickener of Example 26 without and with (0.35 part) of the fluorocarbon of Example 1.

Coated panels were prepared, marked, cleaned and evaluated as in Examples 1–7. The scores for the panels are shown in Table X.

TABLE X

| Thickener | Fluorocarbon | Crayon | Mark China marker | Oil dag |
| --- | --- | --- | --- | --- |
| Methocel | No | 2 | 3 | 1 |
| " | Yes | 2.5 | 3 | 1 |
| Example 21 | No | 2 | 3 | 1 |
| " | Yes | 1 | 2 | 1 |
| Example 26 | No | 5 | 5 | 1 |
| " | Yes | 1 | 2.5 | 1 |

EXAMPLE 45

The coating composition of Example 43 was prepared except other acrylic binders and a vinyl chloride polymer binder were used with and without the thickener and fluorocarbon referred to in Example 43.

Coated panels were prepared, marked, cleaned and evaluated as in Examples 1–7. The scores for the panels are shown in Table XI.

TABLE XI

| Binder | Thickener | Fluorocarbon | Crayon | Mark China marker | Oil dag |
| --- | --- | --- | --- | --- | --- |
| Rhoplex AC-490* | No | No | 5 | 4 | 1 |
| " | Yes | No | 2 | 1 | 1 |
| " | No | Yes | 4 | 5 | 1 |
| " | Yes | Yes | 1 | 1 | 1 |
| Rhoplex AC-507* | No | No | 5 | 5 | 1 |
| " | Yes | No | 4 | 2 | 1 |
| " | No | Yes | 4 | 4 | 1 |
| " | Yes | Yes | 2 | 1 | 1 |
| Rhoplex AC-6* | No | No | 5 | 5 | 1 |
| " | Yes | No | 1 | 1 | 1 |
| " | No | Yes | 5 | 5 | 1 |
| " | Yes | Yes | 1 | 1 | 1 |
| Geon 450X20** | No | No | 5 | 5 | 5 |
| " | Yes | No | 1 | 3 | 5 |
| " | No | Yes | 3 | 5 | 5 |
| " | Yes | yes | 1 | 1 | 3 |

*The Rhoplex resin latices are sold by the Rohm and Haas Co. and the copolymers are believed to be carboxylic acid containing acrylic copolymers of different monomers containing adhesion promoting groups.
**The Geon latex is sold by B. F. Goodrich Chemical Co. and is believed to be a vinyl chloride/acrylic copolymer with the copolymer containing some carboxylic acid.

EXAMPLE 46

A base, clear coating composition having a pH of about 9.5 was prepared having the following approximate composition:

| Ingredients | % by Weight |
| --- | --- |
| Binder MMA/2EHA/MAA (44/54/2) | 28.2 |
| Non-ionic surfactant ("Triton" X-100) | 0.01 |
| Ammonia | 1.3 |
| Water | 62.4 |
| Ethylene glycol | 0.06 |
| Propylene glycol | 8.03 |
| | 100.00 |

To portions of the base composition was added (1) 1.4 parts of the thickener of Examples 1–7, (2) 0.039 part of the fluorocarbon of Example 1, and (3) 0.039 part of fluorocarbon and 1.4 parts thickener, respectively.

A panel coated with the base composition, marked and cleaned as in Examples 1–7, scored 5,5,5. Panels, also so prepared with compositions (1), (2) and (3) above and also marked and cleaned, scored (1) 5,5,2; (2) 5,5,3; and (3) 1,1,1.

EXAMPLE 47

A flat wall paint was prepared which had the following approximate composition:

| Ingredients | % by Weight |
| --- | --- |
| Titanium dioxide | 25.3 |
| Calcium carbonate | 2.9 |
| Aluminum silicate | 2.9 |
| Diatomaceous earth | 7.1 |
| Colloidal magnesium aluminum silicate | .93 |
| Calcined clay | 2.8 |
| MMA/2EHA/MAA (44/54/2) | 9.6 |
| MAA/SMA (95/5) Thickener | .3 |
| "Balab" 748 defoamer | .1 |
| Phenyl mercury propionate | .02 |
| Fluorocarbon of Example 1 | .3 |
| "Triton" X-100 non-ionic surfactant | .3 |
| Polypropylene glycol | .2 |
| "Tamol" 731 (dispersant) | .09 |
| "Triton" X-405 non-ionic surfactant | .06 |
| Ammonia | .5 |
| Water | 35.1 |
| Ethylene glycol | 9.5 |
| Propylene glycol | 2.0 |
| | 100.00 |

This paint had about 53% solids, a PVC of about 57 and a pH of about 9.5. Painted panels when marked with crayon, china marker and oil dag were easily cleaned.

What is claimed is:

1. An aqueous coating composition comprising:
   a. an aqueous dispersion of at least one particulate water insoluble copolymer of ethylenically unsaturated monomers of 2 to 20 carbon atoms containing a water-soluble non-ionic surfactant, said copolymer containing about 0.5 to 10% by weight of ethylenically unsaturated acid monomer units and having a number average molecular weight of at least 50,000;
   b. about 0.2 to 10% by weight, based on total solids, of a thickener selected from the group consisting of
      1. a copolymer of 99–50% by weight of an α,β-ethylenically unsaturated carboxylic acid and 1–50% by weight of at least one alkyl acrylate or alkyl methacrylate wherein the alkyl group is from 10 to 30 carbon atoms,
      2. a copolymer of 15–99% by weight of acrylic acid or methacrylic acid, 0–30% by weight of an alkyl acrylate or alkyl methacrylate wherein the alkyl group is from 10 to 30 carbon atoms and 1–55% by weight of an ester of the formula

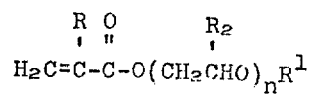

wherein
   $R^2$ and $R$ are hydrogen or methyl,
   $n$ is an integer of 6 to 80, and
   $R^1$ is alkyl of 1 to 20 carbon atoms or alkylphenyl where the alkyl is from one to 20 carbon atoms,
      3. a mixture of (i) 1 to 50 parts by weight of a copolymer of about 2–50% by weight of itaconic anhydride or a compound of the formula

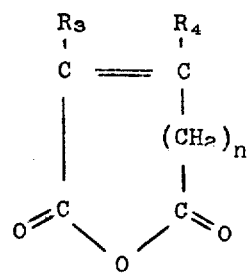

wherein
   $R_3$ and $R_4$ are hydrogen, halogen, —CN, alkyl of one to six carbons, phenyl, benzyl or a cycloaliphatic radical of three to six carbons, and
   $n$ is 0 to 3 and
   about 98–50% by weight of an alkene of two to nine carbons, vinyl acetate, styrene, vinyl chloride, methyl vinyl ether, ethyl vinyl ether, indene, cinnamic acid alkyl ester, acenaphthalene, acrylonitrile or an alkyl ester of acrylic acid or methacrylic acid wherein the alkyl group is one to 18 carbon atoms, with (ii) 1 part by weight of a compound of the formula

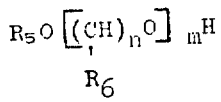

wherein
  $R_5$ is alkyl of one to 18 carbons or aryl of six to 20 carbons,
  $R_6$ is H or methyl,
  $n$ is a positive integer of 2 or 3, and
  $m$ is a positive integer of 1 to 100, and
  (4) mixtures thereof; and
c. about 0.01–5% by weight, based on total solids, of a segmented, hybrid fluorine-containing compound, [H] — [F], comprising a balance of the following:
  1. one or more [H] segments containing at least one water-solvatable polar group and substantially free from fluorinated aliphatic pendant groups of at least three carbon atoms terminated by trifluoromethyl groups, and in which at least 10% by weight of the [H] segments are the water-solvatable polar groups, and
  2. one or more [F] segments substantially free from water-solvatable polar groups, containing from 2 to 85% by weight of three to 30 fully fluorinated carbon atoms terminated by trifluoromethyl groups and providing in the fluorocarbon at least 1% by weight of bound fluorine, the intraconnecting structure of the [F] segments being substantially free of fluorine,
said composition having a pH in the range of about 7 to 10.5.

2. The composition of claim 1 which contains at least one pigment.

3. The coating composition of claim 1 wherein the thickener is at least one of a copolymer of about 99 to 85% by weight methacrylic acid and about 1 to 15% by weight stearyl methacrylate and a copolymer of about 25 to 94% by weight methacrylic acid, about 1 to 25% by weight stearyl methacrylate and about 5 to 50% by weight of an ester of the formula

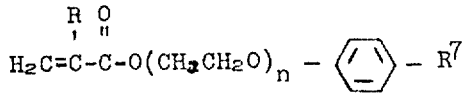

wherein
  R is hydrogen or methyl,
  $n$ is an integer of 6 to 80, and
  $R^7$ is alkyl of eight to 20 carbon atoms.

4. The coating composition of claim 1 wherein the water insoluble copolymer is of at least one alkyl acrylate or alkyl methacrylate wherein the alkyl is from 1 to 10 carbon atoms and about 0.5 to 10% by weight of acrylic acid or methacrylic acid.

5. The coating composition of claim 4 wherein a portion of the acid groups of the water insoluble copolymer have been iminated with ethyleneimine or propyleneimine.

6. The coating composition of claim 1 wherein the fluorine-containing compound is a fluoroalkyl phosphate of the formula:

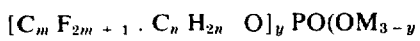

wherin
  $n$ is an integer of 1 to 16 inclusive,
  $m$ is an integer of 4 to 12 inclusive, provided $C_m$ and $C_n$ jointly contain a straight chain of not less than eight carbon atoms,
  $y$ is a number of average value of 1 to 2.5, and
  M is a cation selected from the group consisting of hydrogen, alkali metal, ammonium and substituted ammonium.

7. The coating composition of claim 6 wherein the fluoroalkyl phosphate has the formula

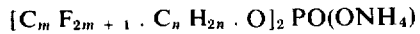

wherein
  $n$ is an integer of 2 to 12 inclusive, and
  $m$ is an integer of 4 to 8 inclusive provided $C_m$ and $C_n$ jointly contain a straight chain of not less than eight carbons.

8. The coating composition of claim 4 wherein the thickener is at least one of a copolymer of about 99 to 85% by weight methacrylic acid and about 1 to 15% by weight stearyl methacrylate and a copolymer of about 25 to 94% by weight methacrylic acid, about 1 to 25% by weight stearyl methacrylate and about 5 to 50% by weight of an ester of the formula

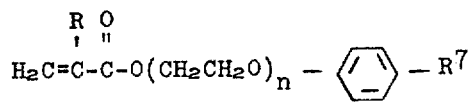

wherein
  R is hydrogen or methyl,
  $n$ is an integer of 10 to 50, and
  $R^7$ is alkyl of eight to 20 carbon atoms.

9. The coating composition of claim 4 wherein the fluorine-containing compound is a fluoroalkyl phosphate of the formula:

wherein
  $n$ is an integer of 1 to 16 inclusive,
  $m$ is an integer of 4 to 12 inclusive, provided $C_m$ and $C_n$ jointly contain a straight chain of not less than eight carbon atoms,
  $y$ is a number of average value of 1 to 2.5, and
  M is a cation selected from the group consisting of hydrogen, alkali metal, ammonium and substituted ammonium.

10. The coating composition of claim 8 wherein a portion of the acid groups of the water insoluble copolymer have beem iminated with ethyleneimine or propyleneimine.

11. The coating composition of claim 9 wherein a portion of the acid groups of the water insoluble copolymer have been iminated with ethyleneimine or propyleneimine.

12. The coating composition of claim 3 which contains at least one pigment.

13. The coating composition of claim 6 which contains at least one pigment.

14. The coating composition of claim 8 which contains at least one pigment.

15. The coating composition of claim 9 which contains at least one pigment.

16. The coating composition of claim 8 wherein the fluorine-containing compound is a fluoroalkyl phosphate of the formula:

$$[C_m F_{2m+1} \cdot C_n H_{2n} \cdot O]_y PO(OM)_{3-y}$$

wherein
- $n$ is an integer of 1 to 16 inclusive,
- $m$ is an integer of 4 to 12 inclusive, provided $C_m$ and $C_n$ jointly contain a straight chain of not less than eight carbon atoms,
- $y$ is a number of average value of 1 to 2.5, and
- M is a cation selected from the group consisting of hydrogen, alkali metal, ammonium and substituted ammonium.

17. The coating composition of claim 16 which contains at least one pigment.

18. An aqueous paint composition having a pH within the range of 8 to 10.5 comprising
   a. an aqueous dispersion of at least one particulate water insoluble copolymer containing 0.05 to 5% by weight of a water-soluble nonionic surfactant, said copolymer comprising about 40 to 50% by weight methyl methacrylate, 45 to 59% by weight 2-ethylhexyl acrylate and 1 to 5% by weight methacrylic acid, and having a number average molecular weight of at least 100,000, the copolymer particles having diameters within the range of about 0.05 to 3 microns;
   b. about 0.5 to 5% by weight, based on total solids, of a thickener which is at least one of a copolymer of about 97 to 90% by weight methacrylic acid and about 3 to 10% by weight stearyl methacrylate and a copolymer of about 35 to 90% by weight methacrylic acid, about 5 to 15% by weight stearyl methacrylate and about 5 to 50% by weight of an ester of the formula

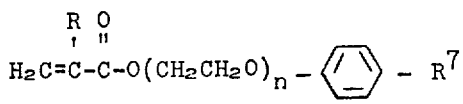

wherein
- R is hydrogen or methyl,
- $n$ is an integer of 10 to 50, and
- $R^7$ is alkyl of eight to 20 carbon atoms;
   c. about 0.02 to 1% by weight, based on total solids, of a fluoroalkyl phosphate of the formula $$[C_m F_{2m+1} \cdot C_n H_{2n} \ O]_2 PO(ONH_4)$$

wherein
- $n$ is an integer of 2 to 12 inclusive,, and
- $m$ is an integer of 4 to [inclusive, provided $C_m$ and $C_n$ jointly contain a straight chain of not less than eight carbons; and
   d. at least one pigment in an amount sufficient to give a pigment loading of 10 to 65% by weight of the solids in the composition.

19. The paint composition of claim 18 wherein a portion of 8 acid groups of the water insoluble copolymer have been iminated with ethyleneimine or propyleneimine such that the copolymer has at least 1% by weight thereof of free acid monomer units.

20. The paint composition of claim 19 wherein the pigment loading is 15 to 50% by weight of the solids in the composition.

* * * * *